Figure 1:
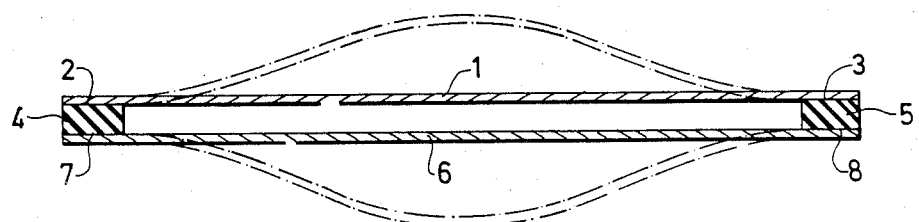

United States Patent [19]

Stranicky

[11] Patent Number: 4,807,591
[45] Date of Patent: Feb. 28, 1989

[54] SOLAR-HEAT ABSORBING DEVICE

[76] Inventor: Fedor Stranicky, Ankdammsgatan 29, S-171 43 Solna, Sweden

[21] Appl. No.: 733,395

[22] Filed: May 10, 1985

Related U.S. Application Data

[63] Continuation of Ser. No. 480,957, Mar. 23, 1983, abandoned.

[51] Int. Cl.⁴ .................................................. F24J 2/36
[52] U.S. Cl. .................................... 126/426; 126/444; 126/448
[58] Field of Search ............... 126/426, 442, 445, 444, 126/448, 450, 417; 165/46, 168

[56] References Cited

U.S. PATENT DOCUMENTS

| | | | |
|---|---|---|---|
| 3,996,092 | 12/1976 | Sarazin et al. | 126/445 |
| 4,008,708 | 2/1977 | Hagarty | 126/445 |
| 4,026,268 | 5/1977 | Bartos et al. | 126/445 |
| 4,036,209 | 7/1977 | Press | 126/426 |
| 4,059,095 | 11/1977 | Grundmann et al. | 126/426 X |
| 4,062,350 | 12/1977 | Reed | 126/444 |
| 4,217,007 | 8/1980 | Filippa | 308/187.1 X |
| 4,326,500 | 4/1982 | Bernhardt et al. | 126/450 X |
| 4,339,962 | 7/1982 | Babel | 74/411 X |
| 4,392,481 | 7/1983 | Moore | 126/444 X |

FOREIGN PATENT DOCUMENTS

| | | | |
|---|---|---|---|
| 2636533 | 3/1977 | Fed. Rep. of Germany | 126/444 |
| 2540674 | 3/1977 | Fed. Rep. of Germany | 126/426 |
| 2513363 | 3/1983 | France | 126/426 |
| 48001 | 1/1980 | Japan | 126/448 |

Primary Examiner—James C. Yeung
Attorney, Agent, or Firm—Kinzer, Plyer, Dorn, McEachran & Jambor

[57] ABSTRACT

A solar-heat absorbing device comprising two elongate, thin, flexible lengths of material (41, 42) joined together along lines (44) in a manner such as to form fluid channels (45) between the material lengths. One of the material lengths (41) comprises a thin metal sheet, and the other (42), is made of rubber, at least long the joining (44), the rubber being joined to the other material length (41) by vulcanizing.

2 Claims, 2 Drawing Sheets

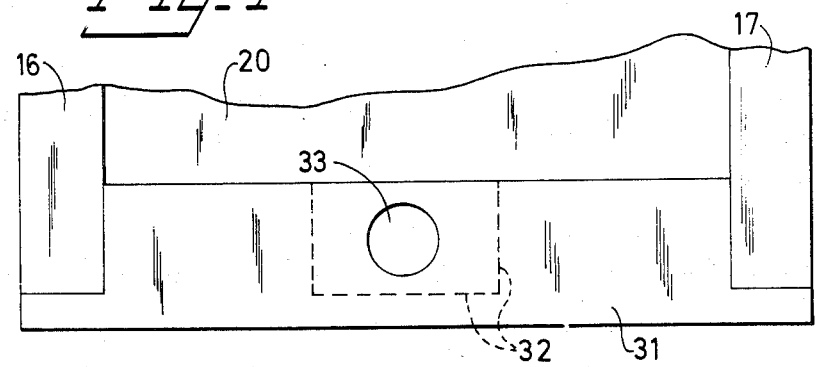
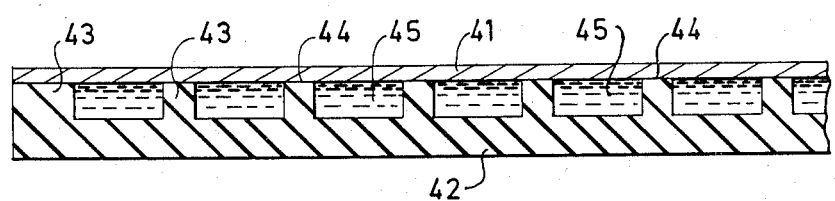
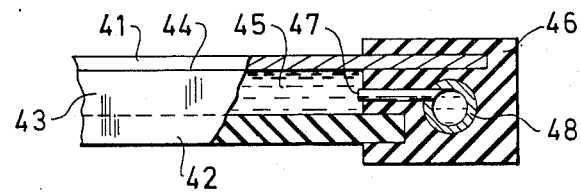

SOLAR-HEAT ABSORBING DEVICE

This is a continuation of application Ser. No. 480,957, filed Mar. 23, 1983, abandoned.

The present invention relates to a solar-heat absorbing device comprising two elongate, thin, flexible lengths of material placed one upon the other and joined along lines in a manner such as to form one or more fluid channels between said lengths. The device is primarily intended for use in the construction of solar-collector systems covering large areas, including a heat-absorber section having high heat-absorbing and heat-transmission properties, and optionally a transparent cover means, where both the absorber section and the cover means are flexible and can be rolled-up on bobbins, and where the absorber section is fully resistant to corrosion attack by water having a high salt content and is able, at the same time, to withstand high temperatures. The device, however, can also be used, to advantage, as a solar collector in roof or outer-wall structures of buildings.

In the thermodynamic conversion of solar energy to electricity and/or the desalination of salt water, a collector array having a surface area in the order of 15,000 $m^2$ is required to produce 1 MW of electricity. In addition to this collector array, there is required a further collector surface area of 50,000 $m^2$ for shortterm solar-heat storage, in order to allow the plant to be operated for 24 hours a day, which is a condition for acceptable viability. Calculated per square meter, solar-energy collectors known today are excessively expensive, and are difficult to transport and erect or install in remote and difficultly reached geographical locations, which applies to the majority of countries in the equatorial belt. Above all, the known collectors possess unsatisfactory properties with regard to their efficiency and their resistance to corrosion against sea water of high salt content in combination with temperatures reaching from 80° to 90° C.

The object of the invention is to eliminate all of the aforementioned disadvantages. This object has been realised with a solar-heat absorbing device having the characteristics set forth in the claims. Thus, the solar-heat absorbing device according to the invention has an absorber which is made of a corrosion-resistant material, having a high heat-passage number, and which, subsequent to being completed in the factory or plant, can be rolled-up onto bobbins and then unrolled at a selected site, the square-meter price of the collector on site not exceeding 150 Swedish Crowns. In turn this enables prices of between 20–30 Swedish Ore per kilowatt hour to be achieved when converting solar energy to electricity thermodynamically, and also provides for low prices per cubic meter of desalinated sea water. In accordance with the invention, the absorber section may, for example, comprise two 0.10–0.15 mm thick copper foil of suitable width placed one upon the other and sealingly joined along their long edges to form a tube-like passage for either water, air or some other medium to be heated by solar energy. The absorber section thus constructed and comprising thin metal sheets can be readily rolled-up on bobbins during manufacture, and when placed in position on site can be inflated or expanded to oval or circular cross-sectional shape, or some other cross-sectional shape, by the pressure of the medium circulating and enclosed in said absorber section. Experiments have shown that the most difficult step in the manufacture of such absorbers is that of joining the two thin metal foils along their edges. Different methods have been tested, such as bonding with boding resins of the araldite or silicone type. Neither of these adhesives has been found suitable in conjunction with water at temperatures reaching 80°–90° C. Tests have also been made with both seam welding and cold welding using two rolls under high pressure. These methods have been found complicated and difficult to execute, because of the small thickness to the copper foil. On accordance with the invention, these difficulties encountered in manufacture can be eliminated by using heat-resistant rubber strips which by vulcanizing along the edges of the thin metal foils join the upper and the lower copper foils together in a corrosion-resistant, flexible and heat-tolerable fashion. It is known that when rubber is vulcanized on metal, rubber diffuses into the outer surface of the metal, thereby to create an extremely strong joint. Since rubber can also be vulcanized onto material other than metal, a metal sheet, e.g. foil, comprising the upper part of the absorber section and answering for the good heat-absorbing and heat-transmission properties, can be combined wth another, less expensive material, which comprises the lower part of the absorber. Since rubber can be vulcanized onto plastics and other materials, the combination possibilities are prolific with respect to the upper part of the absorber, which is turned to face the solar radiation and the lower part of the absorber, enabling a minimization of the price for the absorber section. The absorber section can be completed with a transparent cover material. The absorber section and the cover can, in both cases, be rolled-up onto bobbins during manufacture, and then unrolled from the bobbins on site, which is one of the prerequisites for obtaining a low total price for solar collectors calculated per square meter when incorporated in wide collector arrays. All of the aforementioned properties are also of value in solar collectors intended for installation on roofs and outer-wall structures of buildings The invention will now be described in more detail with reference to the accompanying drawings, which illustrate the mode of use of the invention.

Figure 2:
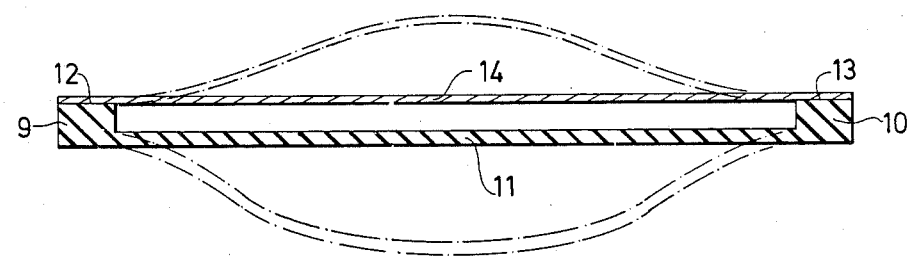
Figure 3:
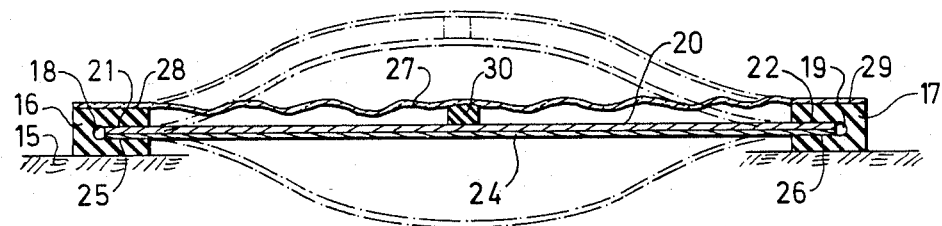

FIG. 1 is a cross-sectional view of a preferred solar collector intended for buildings, and FIG. 2 is a side view, partially in section, of a connection to one end of the collector illustrated in FIG. 1.

FIGS. 1 and 2 illustrate a highly efficient, preferred embodiment of a solar collector according to the invention intended for installation on the roof and/or outer-wall structure of a building. In this embodiment the heat-absorbing section comprises a thin metal sheet 41 to which a rubber mat 42 having upstanding ribs 43 is firmly vulcanized at surfaces 44. Formed between the ribs 43 is a plurality of passages having a width of at most about 10 mm and a depth of about 2–3 mm. A connecting block 46 made of rubber and having a connecting pipe 47 protruding into respective passages 45 is searingly vulcanized to the ends of said plate 41 and said mat 42. The connecting pipes 47 extend from a distributor pipe 48 connected to a pipe-line (not shown) from which the circulation water of the solar collector is supplied. The pipes 47 and 48 are also vulcanized in the block 46. In this embodiment, the rigidity of the plate 41 and the rubber mat 42 is such that the passages 45 will not be deformed to any great extent by the pressure of the water in said passages. This ensures a high degree of efficiency in operation, and enables the solar collector to be readily mounted on the roof or walls of a building, substantially by bonding to the support structure, for example to a sheet-metal roof.

Wide possibilities in variation are possible within the scope of the invention, to obtain significant reductions in price per square meter of solar collector in relation to solar collectors known hitherto. Preferably, such a reduction in price is achieved with respect to the absorber section of the collector, while retaining maximum heat-transmission ability, resistance to corrosion and to heat, by making the upper part of the collector, said upper part being exposed to solar radiation, from copper foil, for example, and the lower part from inexpensive aluminum foil or galvanized, thin iron sheet, which may be coated with a thin layer of rubber, thereby providing the lower part of the collector with the same resistance to corrosion as that exhibited by the much more expensive copper foil. Thus, the rubber layer on the lower part of the absorber section can be used as a means of sealingly connecting the lower part of the absorber section to the upper part thereof, by vulcanizing at suitable locations. This possibility of vulcanizing the upper, solar-heat receiving part of the absorber to the lower part thereof can also be achieved with other material combinations possible within the scope of the invention, which minimizes the total price of the absorber and therewith also the solar collector.

I claim:

1. A solar-heat absorbing device comprising first and second elongated, thin flexible lengths of material placed one upon the other and joined together along a plurality of parallel, continuous longitudinally extending lines to form a plurality of separate fluid passages between said first and second lengths of material, characterized in that the first length of material (41) comprises a thin metal sheet positioned to be exposed to solar radiation formed, for example, of copper, brass, stainless steel or the like, the second length of material (42) comprising a heat-resistant rubber material having a plurality of integral mutually parallel upstanding ribs extending continuously from one end portion of the elongated device to the other end portion (43) onto which ribs the first material length is firmly vulcanized forming the plurality of passages (45) extending between said ribs (43).

2. A solar-heat absorbing device comprising first and second elongated, thin flexible lengths of material placed one upon the other and joined together along a plurality of parallel, continuous longitudinally extending lines to form a plurality of separate fluid passages between said first and second lengths of material, characterized in that the first length of material (41) comprises a thin metal sheet positioned to be exposed to solar radiation formed, for example, of copper, brass, stainless steel or the like, the second length of material (42) comprising a heat-resistant rubber material having a plurality of integral mutually parallel upstanding ribs extending continuously from one end portion of the elongated device to the other end portion (43) onto which ribs the first material length is firmly vulcanized forming the plurality of passages (45) extending between said ribs (43), said end portions of the elongated device each being enclosed by a transverse connecting block (46) sealingly joined to said end portions.

* * * * *